United States Patent
Tsai et al.

(10) Patent No.: US 7,933,087 B1
(45) Date of Patent: Apr. 26, 2011

(54) DISK DRIVE STORING PARAMETERS OF A WRITE OPERATION IN A PLURALITY OF DATA SECTORS

(75) Inventors: Chun Sei Tsai, Tustin, CA (US); William B. Boyle, Lake Forest, CA (US); Carl E. Barlow, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 385 days.

(21) Appl. No.: 12/141,693

(22) Filed: Jun. 18, 2008

(51) Int. Cl.
*G11B 5/09* (2006.01)
(52) U.S. Cl. .......................................................... 360/48
(58) Field of Classification Search .................... 360/24, 360/40, 48, 50, 58, 69, 75; 711/113, 114; 710/74; 714/6; 365/63; 358/426.13
See application file for complete search history.

(56) References Cited

U.S. PATENT DOCUMENTS

| | | | | |
|---|---|---|---|---|
| 4,297,727 A | * | 10/1981 | Ogawa et al. | 358/426.13 |
| 5,420,998 A | * | 5/1995 | Horning | 711/113 |
| 5,499,337 A | * | 3/1996 | Gordon | 714/6 |
| 5,640,286 A | | 6/1997 | Acosta et al. | |
| 6,167,461 A | | 12/2000 | Keats et al. | |
| 6,289,471 B1 | * | 9/2001 | Gordon | 714/6 |
| 6,600,614 B2 | | 7/2003 | Lenny et al. | |
| 6,731,445 B1 | | 5/2004 | Houston | |
| 7,154,700 B1 | | 12/2006 | Schreck et al. | |
| 7,173,782 B2 | | 2/2007 | Ikeda et al. | |
| 7,680,969 B1 | * | 3/2010 | Danilak | 710/74 |
| 2007/0217059 A1 | | 9/2007 | Hara | |
| 2009/0204758 A1 | * | 8/2009 | Luning | 711/114 |
| 2009/0244949 A1 | * | 10/2009 | Ravasio et al. | 365/63 |

* cited by examiner

*Primary Examiner* — Fred Tzeng

(57) ABSTRACT

A disk drive is disclosed comprising a disk having a plurality of data sectors, and a head actuated over the disk. The disk drive further comprises control circuitry operable to execute a write operation for writing data to the disk. A first part of the data is written to a first data sector together with a first sector signature data (SSD) record comprising a first parameter of the write operation and a first id that identifies the first parameter. A second part of the data is written to a second data sector together with a second SSD record comprising a second parameter of the write operation and a second id that identifies the second parameter.

23 Claims, 6 Drawing Sheets

| SSD_ID | SSD DATA | END BIT |
|---|---|---|
| 0x0 | 4 bits Ftemp, 4 bits WDFH, 1 bit Write Abort, 1 bit Sequential/Random | X |
| 0x1 | Timestamp, 1 bit Write Abort, 1 bit Sequential/Random | X |
| 0x2 | Channel Write Parameter 1 (Temperature, full resolution) | X |
| 0x3 | Channel Write Parameter 2 (DFH, write, full resolution) | X |
| 0x4 | Channel Write Parameter 3 (Write current, full resolution) | X |
| 0x5 | Channel Write Parameter 4 (Overshoot, Duration) | X |
| 0x6 | Servo Parameter 1 (PES, full resolution) | X |
| 0x7 | Servo Parameter 2 (PES, full resolution) | X |
| 0x8 | Servo Parameter 3 | X |
| 0x9 | F/W Write Command Parameter 1 (Nature of write, foreground, background) | X |
| 0xA | F/W Write Command Parameter 2 (DRM update, cache flush, DLG-I/II) | X |
| 0xB | F/W Write Command Parameter 3 | X |

FIG. 3

DISK DRIVE STORING PARAMETERS OF A WRITE OPERATION IN A PLURALITY OF DATA SECTORS

BACKGROUND

When a disk drive fails while in the field, it may be returned to the manufacturer for evaluation to determine the cause of the failure so that the manufacturing process can be modified to reduce the number future failures. A disk drive typically fails when it is unable to recover user data written to the disk which may be due to suboptimal operating parameters at the time of the write operation. For example, a write operation may be adversely affected by the ambient temperature, the fly-height of the head, the write current amplitude or overshoot, or a servo parameter, such as the position error signal generated while tracking the centerline of the written track. It would therefore be desirable to store the parameters of a write operation so they can be read and evaluated in the event of a failure.

SUMMARY OF EMBODIMENT OF THE INVENTION

A disk drive is disclosed comprising a disk having a plurality of data sectors, and a head actuated over the disk. The disk drive further comprises control circuitry operable to execute a write operation for writing data to the disk. A first part of the data is written to a first data sector together with a first sector signature data (SSD) record comprising a first parameter of the write operation and a first id that identifies the first parameter. A second part of the data is written to a second data sector together with a second SSD record comprising a second parameter of the write operation and a second id that identifies the second parameter.

BRIEF DESCRIPTION OF THE DRAWINGS

FIG. 3 shows a format of an SSD according to an embodiment of the present invention.

DETAILED DESCRIPTION OF EMBODIMENTS OF THE INVENTION

Figure 1:
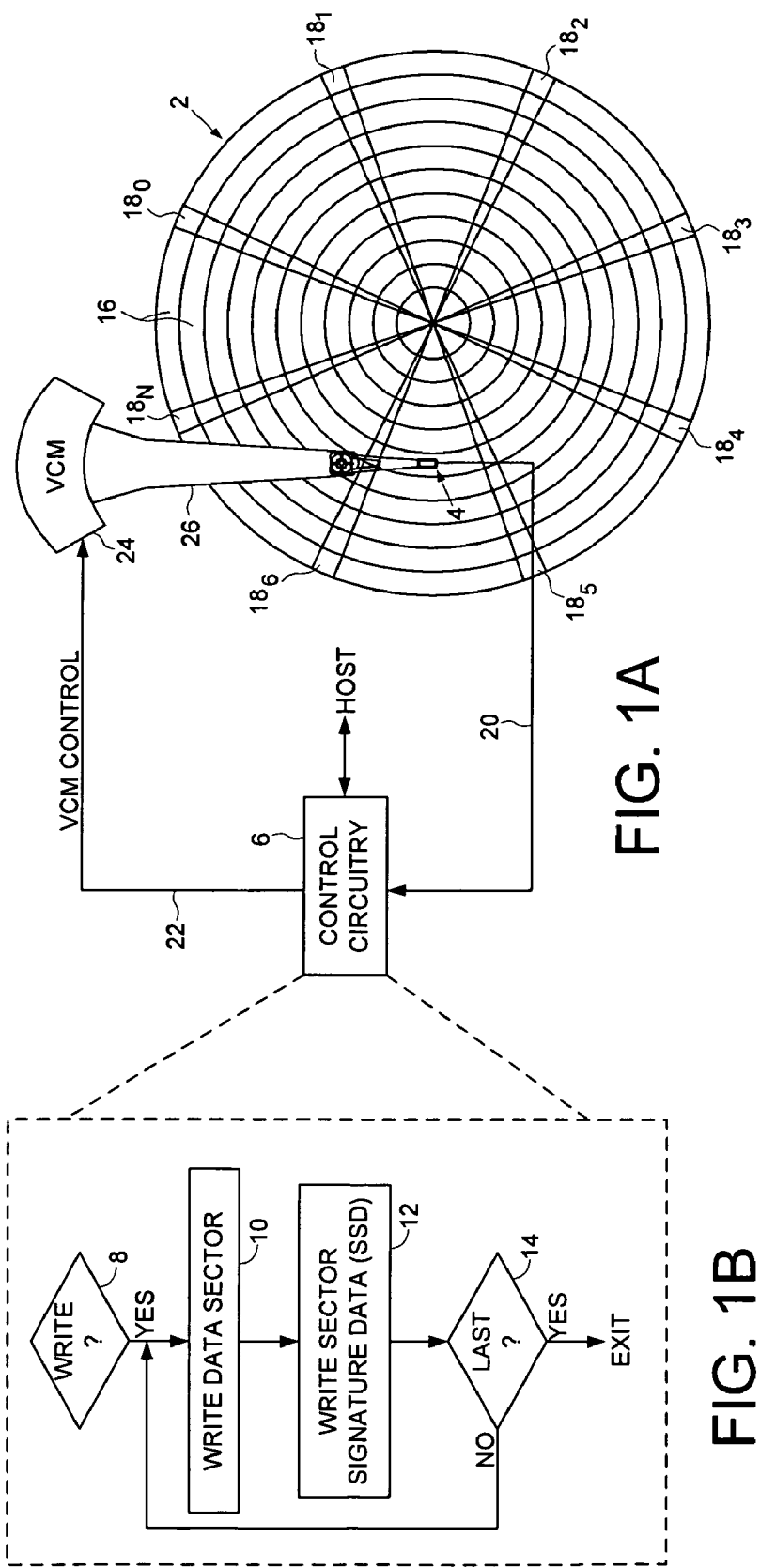
FIG. 1A shows a disk drive according to an embodiment of the present invention comprising a disk, a head actuated over the disk, and control circuitry for executing a write operation.
FIG. 1B is a flow diagram executed by the control circuitry wherein sector signature data (SSD) records are written to a plurality of data sectors during a write operation, wherein each SSD record has a corresponding id.

FIG. 1A shows a disk drive according to an embodiment of the present invention comprising a disk 2 having a plurality of data sectors, and a head 4 actuated over the disk 2. The disk drive further comprises control circuitry 6 operable to execute a write operation for writing data to the disk 2 by executing the flow diagram of FIG. 1B. When a write operation is executed (step 8), a first part of data is written to a first data sector (step 10) together with a first sector signature data (SSD) record comprising a first parameter of the write operation and a first id that identifies the first parameter (step 12). If the write operation is not finished (step 14), a second part of the data is written to a second data sector (step 10) together with a second SSD record comprising a second parameter of the write operation and a second id that identifies the second parameter (step 12).

In the embodiment of FIG. 1A, the disk 2 comprises a plurality of data tracks 16 defined by a plurality of embedded servo sectors $18_0$-$18_N$. Each data track is partitioned into a number of data sectors, wherein each data sector comprises an SSD field for storing an SSD record. The control circuitry 6 processes a read signal 20 emanating from the head 4 in order to demodulate the position information recorded in the embedded servo sectors $18_0$-$18_N$ (e.g., a servo track address and servo bursts). The control circuitry 6 generates a position error signal (PES) representing a position error between a current location of the head and a target location of the head. The control circuitry 6 filters the PES using a suitable compensation filter to generate a VCM control signal 22 applied to a voice coil motor (VCM) 24 which rotates an actuator arm 26 about a pivot in order to move the head 4 in a direction that reduces the PES.

Figure 2:
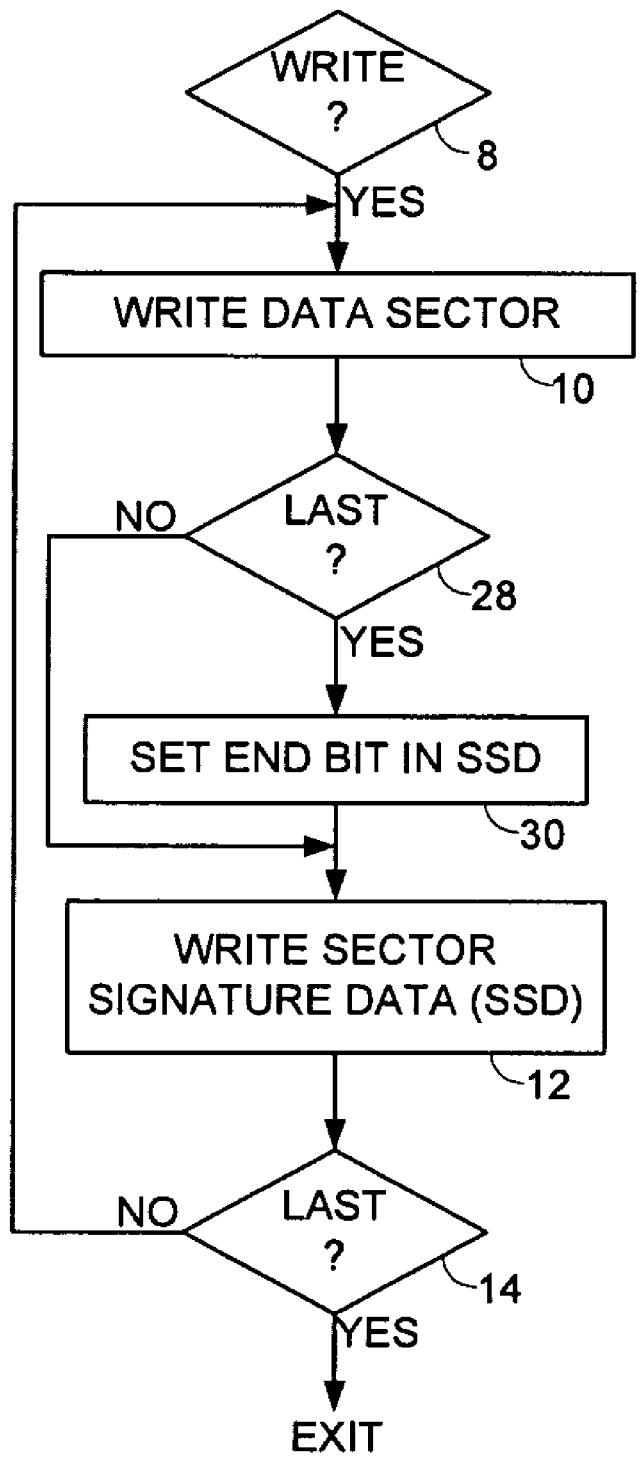
FIG. 2 is a flow diagram executed by the control circuitry wherein an end bit in the SSD record is set for the last data sector written.

FIG. 2 is a flow diagram according to an embodiment of the present invention which extends the flow diagram of FIG. 1B. When the last data sector of the write operation is reached (step 28), the control circuitry 6 sets an end bit in the last SSD record (step 30). The end bit identifies the last SSD record in a sequence of SSD records of the write operation so that when the SSD records are subsequently read, the end of the SSD sequence can be detected.

Each SSD record may identify any suitable parameter of a write operation, wherein FIG. 3 shows example parameters such as the ambient temperature during the write operation, a timestamp, whether the write operation was aborted, whether the write operation was sequential or random, various read channel parameters (e.g., dynamic fly height, write current, overshoot, etc.), various servo parameters (e.g., PES), foreground or background write, and whether the cache was flushed in connection with the write operation. In one embodiment, the timestamp may help evaluate how the recorded data degrades over time, which may be used to optimize a refresh rate of newly manufactured disk drives. In another embodiment, the timestamp may help identify different sequences of SSD records in situations where write operations overlap as described in more detail below with reference to FIG. 5C.

In one embodiment, the parameter of the write operation stored in each SSD record is unique such that the parameter stored in a first SSD record is not stored in a second SSD record, and the parameter stored in the second SSD record is not stored in the first SSD record. FIG. 3 illustrates an example of this embodiment wherein each SSD record stores a unique parameter of a write operation.

In the embodiment of FIG. 3, each SSD record comprises an id which identifies which parameter is recorded in the data field of the SSD record. In addition, each SSD record further comprises an end bit which identifies the last SSD record of a write operation. In this embodiment, the SSD records are written sequentially and eventually wrap around to the first SSD record given enough data sectors in the write operation. Therefore, any SSD record may be the last SSD record of a write operation, wherein the control circuitry 6 automatically sets the end bit when the last data sector of the write operation is reached.

In one embodiment, the parameters which have the most impact on a write operation are located near the beginning of the SSD sequence. In this manner, when a write operation comprises only a few data sectors, it ensures that the most relevant parameters are recorded with the write operation. In the example of FIG. 3, the ambient temperature has a significant affect on the write operation and is therefore recorded in the first SSD record written to the disk.

Figure 4:
FIG. 4 shows a format of a data sector according to an embodiment of the present invention wherein the SSD record is written after the error correction code (ECC) data.

Each SSD record may be written with each data sector of a write operation in any suitable format. FIG. 4 shows an embodiment of the present invention wherein an SSD record is written after the error correction code (ECC) data of a data sector, wherein the SSD is not protected by the ECC. In another embodiment, the SSD record may be written in the data sector after the user data but prior to the ECC and also protected by the ECC. In yet another embodiment, the SSD record may be written in the data sector prior to the user data. In still another embodiment, the SSD record may be written independent of the data sector (e.g., before or after the data sector), and in one embodiment, each SSD record comprises a preamble and sync mark for synchronizing to the SSD record. Each SSD record may also comprise ECC data (independent of the data sector ECC) for detecting and correcting errors in the SSD record.

Figure 5A:
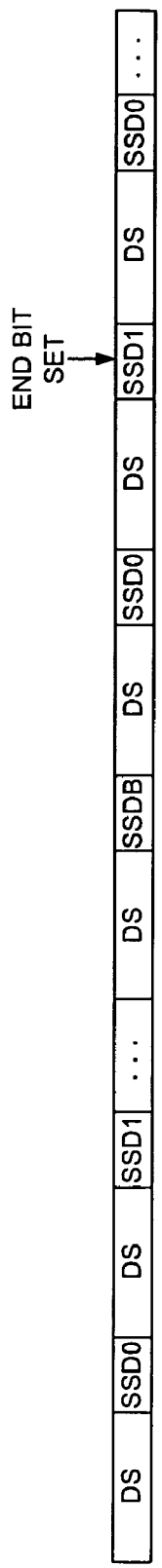
FIG. 5A illustrates how the SSD records are repeated if there are enough data sectors in a write operation according to an embodiment of the present invention.

FIG. 5A illustrates an embodiment of the present invention wherein the sequence of SSD records repeats until the last data sector of the write operation is written, wherein the end bit of the last SSD record is set. In the example of FIG. 5A, the write operation begins with writing SSD0 together with the first data sector, then eventually wraps back around to SSD0, and then the end bit set at SSD1 with the last data sector written for the write operation.

Figure 5B:
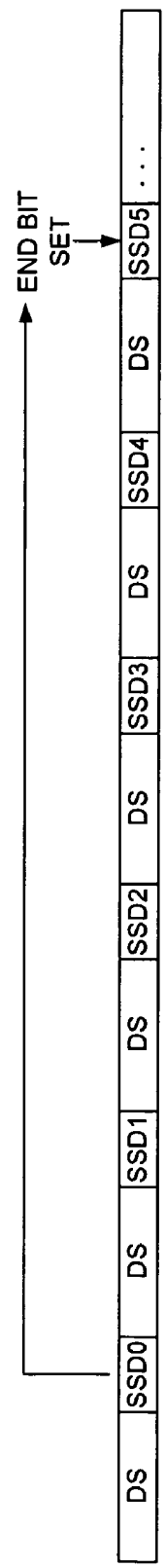
FIG. 5B shows an embodiment of the present invention wherein a starting id and an end bit frames a number of SSD records of a write operation.

FIG. 5B illustrates an embodiment of the present invention wherein the boundaries of a write operation are determined from the id of the first SSD record (SSD0) and the SSD record having its end bit set. In the example of FIG. 5B, the beginning of the write operation is identified by SSD0, and the end of the write operation is identified by SSD5 which has its end bit set. When reading the SSD records from the disk, the id of the first SSD record and the SSD record having its end bit set are used to identify the sequence of SSD records for a particular write operation.

Figure 5C:
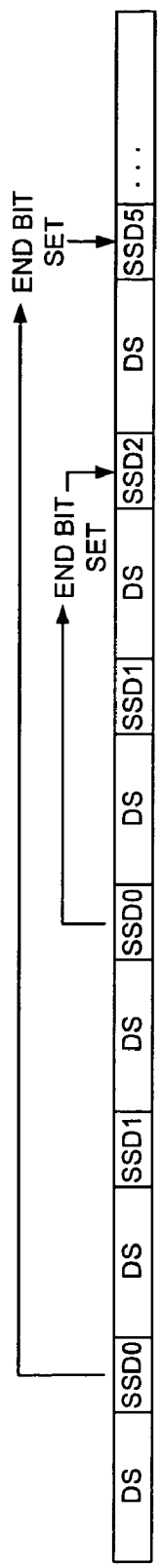
FIG. 5C illustrates an embodiment of the present invention wherein SSD records of a first write operation may be overwritten by SSD records of a second, embedded write operation.

FIG. 5C illustrates a case wherein two data sectors of a first write operation are overwritten by a second write operation. In one embodiment, the two sequences of write operations are distinguished when reading the SSD records by determining the brackets of beginning SSD records (the SSD0s) and the corresponding SSD records having their end bits set. In the example of FIG. 5C, the SSD records of the second write operation are identified by detecting the second SSD0 and SSD2 which has its end bit set, and the SSD records of the first write operation are identified by detecting the first SSD0 and SSD5 which has its end bit set. In another embodiment, the SSD records of a write operation comprise a time stamp which is used to bracket the sequences of SSD records when multiple write operations overlap.

Figure 6A:
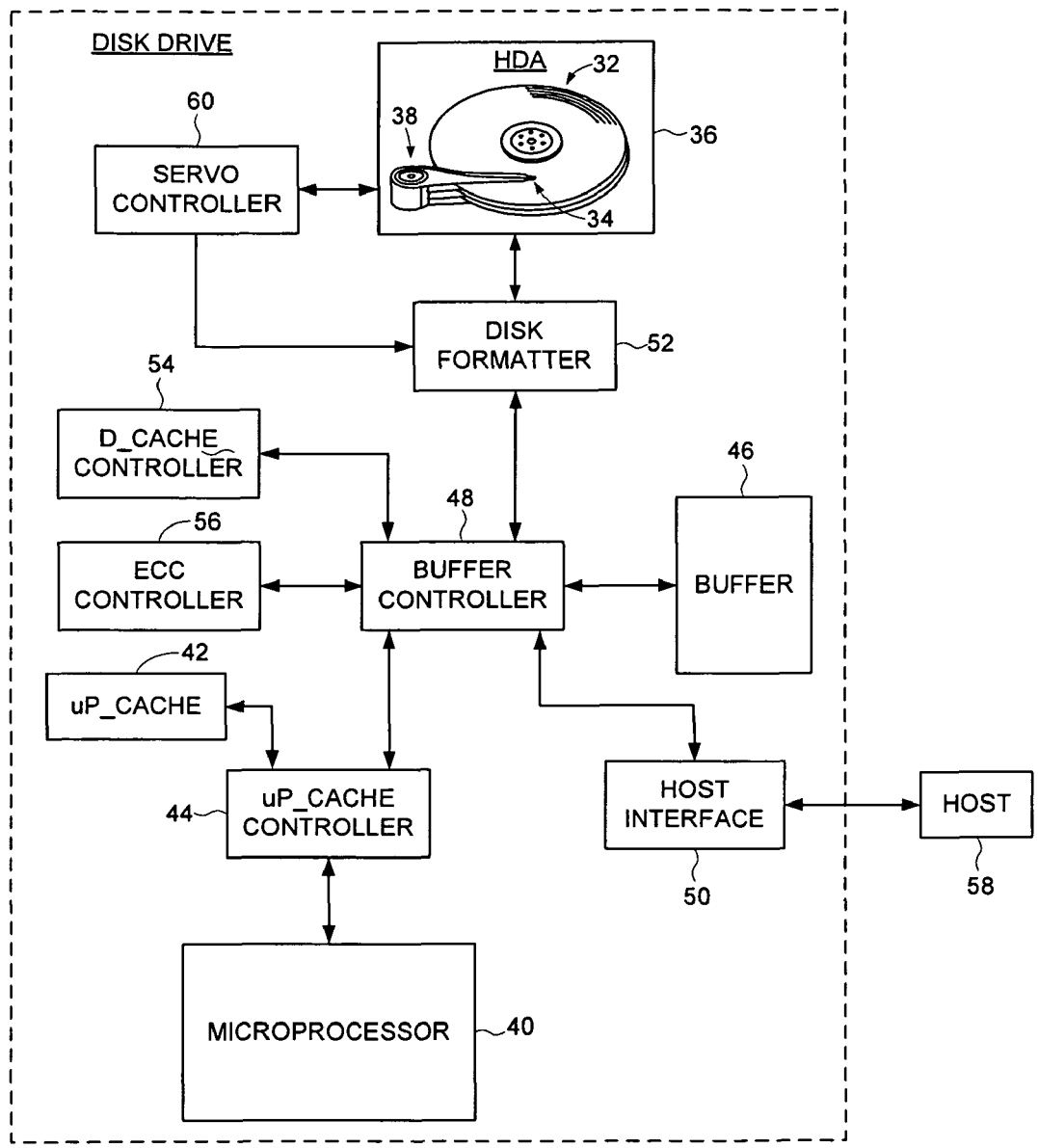
FIG. 6A shows control circuitry according to an embodiment of the present invention including a disk formatter operable to write the SSD records during a write operation.

FIG. 6A shows a disk drive according to an embodiment of the present invention comprising one or more disks 32 and heads 34 housed in a head disk assembly (HDA) 36. The HDA 36 also houses a voice coil motor (VCM) 38 for rotating one or more actuator arms about a pivot in order to actuate the heads 34 over the respective disk surfaces. A printed circuit board (PCB) is mounted to the HDA 36, wherein one or more integrated circuits for controlling operation of the disk drive are mounted on the PCB, including a microprocessor (uP) 40 for executing code segments of a control routine. The microprocessor 40 typically accesses a fast uP cache 42 (e.g., an SRAM) through a uP cache controller 44 which caches control routine op codes being executed as well as control routine data.

The code segments of the control routine are typically stored on the disk 32 and loaded into an external buffer memory 46 (e.g., an SDRAM) when the disk drive is powered on. As the microprocessor 40 executes the control routine, the uP cache controller 44 transfers a burst of corresponding control routine op codes from the external buffer memory 46 into the uP cache 42 for fast access by the microprocessor 40. Since the buffer memory 46 is typically shared with other control components, a buffer controller 48 implements an arbitration algorithm to arbitrate access to the buffer memory 46. Example control components that may share access to the buffer memory 46 include a host interface 50, a disk formatter 52, a data cache controller 54, and an ECC controller 56, one or more of which may be integrated with the microprocessor 40 in a system on a chip (SOC), or implemented as separate integrated circuits.

The host interface 50 facilitates data transfer between the disk drive and a host 58 during read and write operations. That is, during read operations data read from the disk 32 is staged in the buffer memory 46 before the host interface 50 transmits the read data to the host 58, and during write operations data received from the host 58 is staged in the buffer memory 46 before being written to the disk 32. The disk formatter 52 performs the actual interface functions with the HDA 36 in order to write data stored in the buffer 46 to the disk 32, and store data into the buffer 46 that is read from the disk 32. The data cache controller 54 accesses a data cache area of the buffer memory 46 in order to implement a suitable user data caching algorithm, and the ECC controller 56 implements a suitable error correction algorithm on data read from the disk 32 and stored in the buffer 46.

When executing a write operation, the microprocessor 40 configures suitable parameters of the disk formatter 52 such that when the head 34 reaches the first data sector of the write operation, the disk formatter 52 automatically performs the write operation independent of the microprocessor 40. A servo controller 60 processes the embedded servo sectors $18_0$-$18_N$ (FIG. 1A) and provides suitable control signals to the disk formatter 52 to help facilitate the write operation. In one embodiment, the disk formatter 52 generates the sequence of SSD records written to the disk with the data sectors, and also sets the end bit of the last SSD record.

Figure 6B:
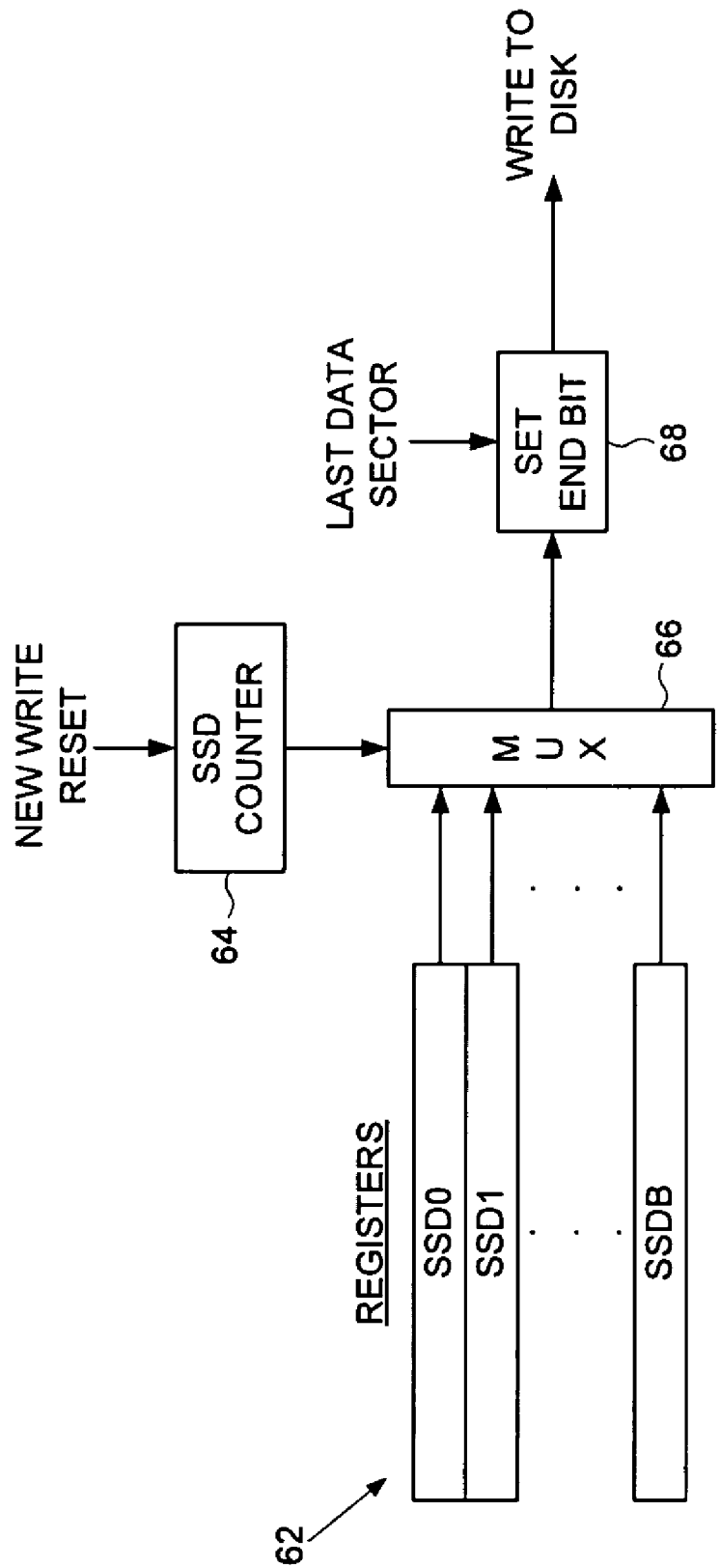
FIG. 6B shows control circuitry according to an embodiment of the present invention including a number of registers each storing a particular SSD record which is selected in an iterative sequence during a write operation.

FIG. 6B shows control circuitry according to an embodiment of the present invention which may be implemented in the disk formatter 52 in order to write the sequence of SSD records during a write operation. The control circuitry comprises a plurality of registers 62 (which may be implemented as a ring buffer or first-in first-out buffer), wherein each register stores an SSD record. An SSD counter 64 is initialized at the beginning of the write operation which is then used to select each SSD record seriatim through multiplexer 66 as each data sector is written to the disk. When the last data sector is written, suitable circuitry 68 sets the end bit of the last SSD record written with the last data sector.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of data sectors;
   a head actuated over the disk; and
   control circuitry operable to execute a write operation for writing data to the disk by:
   writing a first part of the data to a first data sector together with a first sector signature data (SSD) record comprising a first parameter of the write operation and a first id that identifies the first parameter; and
   writing a second part of the data to a second data sector together with a second SSD record comprising a second parameter of the write operation and a second id that identifies the second parameter.

2. The disk drive as recited in claim 1, wherein the second SSD record comprises an end flag identifying the last data sector written out of the first plurality of data sectors.

3. The disk drive as recited in claim 1, wherein the first parameter of the write operation comprises an ambient temperature, and the second parameter of the write operation comprises a servo parameter.

4. The disk drive as recited in claim 1, wherein:
   the first SSD record does not include the second parameter; and
   the second SSD record does not include the first parameter.

5. The disk drive as recited in claim 1, wherein the control circuitry is further operable to write a third part of the user data to a third data sector together with a third SSD record.

6. The disk drive as recited in claim 1, wherein the control circuitry is further operable to write a third part of the user data to a third data sector together with the first SSD record.

7. The disk drive as recited in claim 1, wherein the first id identifies the first SSD record as the beginning of a plurality of SSD records written over the first plurality of data sectors.

8. The disk drive as recited in claim 1, wherein the control circuitry further comprises a plurality of hardware registers for storing a plurality of SSD records.

9. The disk drive as recited in claim 8, wherein the control circuitry is further operable to select one of the registers for writing the corresponding SSD record together with user data to a data sector.

10. The disk drive as recited in claim 1, wherein the control circuitry further comprises a disk formatter for setting an end flag in the last SSD record corresponding to the last data sector of the first plurality of data sectors.

11. The disk drive as recited in claim 1, wherein the control circuitry is further operable to receive a read command from a host to read the first and second SSD records from the first plurality of data sectors.

12. The disk drive as recited in claim 1, wherein the first and second SSDs further comprise a time stamp and the control circuitry is further operable to identify a sequence of SSDs based on the time stamps.

13. A method of executing a write operation in a disk drive, the disk drive comprising a disk comprising a plurality of data sectors, and a head actuated over the disk, the method comprising:
   writing a first part of data to a first data sector together with a first sector signature data (SSD) record comprising a first parameter of the write operation and a first id that identifies the first parameter; and
   writing a second part of the data to a second data sector together with a second SSD record comprising a second parameter of the write operation and a second id that identifies the second parameter.

14. The method as recited in claim 13, wherein the second SSD record comprises an end flag identifying the last data sector written out of the first plurality of data sectors.

15. The method as recited in claim 13, wherein the first parameter of the write operation comprises an ambient temperature, and the second parameter of the write operation comprises a servo parameter.

16. The method as recited in claim 13, wherein:
   the first SSD record does not include the second parameter; and
   the second SSD record does not include the first parameter.

17. The method as recited in claim 13, further comprising writing a third part of the user data to a third data sector together with a third SSD record.

18. The method as recited in claim 13, further comprising writing a third part of the user data to a third data sector together with the first SSD record.

19. The method as recited in claim 13, wherein the first id identifies the first SSD record as the beginning of a plurality of SSD records written over the first plurality of data sectors.

20. The method as recited in claim 13, further comprising storing a plurality of SSD records into a plurality of hardware registers.

21. The method as recited in claim 20, further comprising selecting one of the registers for writing the corresponding SSD record together with user data to a data sector.

22. The method as recited in claim 13, further comprising reading the first and second SSD records from the first plurality of data sectors and transmitting the first and second SSD records to a host.

23. The method as recited in claim 13, wherein the first and second SSDs further comprise a time stamp, the method further comprising identifying a sequence of SSDs based on the time stamps.

* * * * *